US012658101B2

(12) United States Patent
Kim et al.

(10) Patent No.: US 12,658,101 B2
(45) Date of Patent: Jun. 16, 2026

(54) DISPLAY DEVICE, AN ELECTRONIC DEVICE INCLUDING THE SAME, AND A METHOD FOR DRIVING THE ELECTRONIC DEVICE

(71) Applicant: SAMSUNG DISPLAY CO., LTD., Yongin-si (KR)

(72) Inventors: Hyunsu Kim, Yongin-si (KR); Jongman Bae, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/090,841

(22) Filed: Mar. 26, 2025

(65) Prior Publication Data

US 2025/0225910 A1 Jul. 10, 2025

Related U.S. Application Data

(63) Continuation of application No. 18/603,344, filed on Mar. 13, 2024, now Pat. No. 12,283,220.

(30) Foreign Application Priority Data

Jun. 23, 2023 (KR) ........................ 10-2023-0081316

(51) Int. Cl.
*G09G 3/20* (2006.01)

(52) U.S. Cl.
CPC ... *G09G 3/2096* (2013.01); *G09G 2320/0247* (2013.01)

(58) Field of Classification Search
None
See application file for complete search history.

(56) References Cited

U.S. PATENT DOCUMENTS

| | | | |
|---|---|---|---|
| 7,893,912 | B2 | 2/2011 | Kim |
| 10,339,873 | B2 | 7/2019 | Hong |
| 10,394,361 | B2 | 8/2019 | Park |
| 11,468,839 | B2 | 10/2022 | Sang et al. |
| 11,532,269 | B2 | 12/2022 | Lee et al. |
| 11,830,461 | B2 | 11/2023 | Kuroiwa et al. |
| 12,027,098 | B2 | 7/2024 | Kim et al. |
| 2013/0235003 | A1 | 9/2013 | Chang et al. |
| 2017/0124958 | A1 | 5/2017 | Pyo et al. |
| 2018/0151109 | A1 | 5/2018 | Shim et al. |

(Continued)

FOREIGN PATENT DOCUMENTS

| | | | |
|---|---|---|---|
| KR | 10-2122527 | B1 | 6/2020 |
| KR | 10-2022-0022335 | A | 2/2022 |

*Primary Examiner* — Aneeta Yodichkas
(74) *Attorney, Agent, or Firm* — F. CHAU & ASSOCIATES, LLC

(57) ABSTRACT

An electronic device including: a host processor to generate a first clock signal and to output frame data and a synchronization signal; a driving controller to receive the synchronization signal and the frame data from the host processor and to generate a control signal based on a second clock signal; and a display panel, wherein the driving controller synchronizes the second clock signal with the first clock signal based on the synchronization signal, wherein the driving controller includes an error detector to detect an error of the synchronization signal, and wherein the error detector outputs a first signal when the error is an initial synchronization fail error and outputs a second signal different from the first signal when the error is a synchronization loss error.

18 Claims, 8 Drawing Sheets

(56) References Cited

U.S. PATENT DOCUMENTS

| | | | |
|---|---|---|---|
| 2019/0362678 | A1 | 11/2019 | Shin et al. |
| 2020/0226978 | A1 | 7/2020 | Lin et al. |
| 2021/0287605 | A1 | 9/2021 | Wang et al. |
| 2023/0133606 | A1 | 5/2023 | Kim et al. |
| 2024/0013704 | A1 | 1/2024 | Kim et al. |
| 2024/0428721 | A1 | 12/2024 | Kim et al. |

| Initial Time Code | |
|---|---|
| 4'b0000 | 1ms |
| 4'b0001 | 2ms |
| ⋮ | ⋮ |
| 4'b1111 | 16ms |

| Loss Toggle Count Code | |
|---|---|
| 3'b000 | 0 |
| 3'b001 | 1 |
| ⋮ | ⋮ |
| 3'b111 | 8 |

DISPLAY DEVICE, AN ELECTRONIC DEVICE INCLUDING THE SAME, AND A METHOD FOR DRIVING THE ELECTRONIC DEVICE

CROSS-REFERENCE TO RELATED APPLICATIONS

This application is a continuation of U.S. patent application Ser. No. 18/603,344 filed on Mar. 13, 2024, which claims priority under 35 U.S.C. § 119 to Korean Patent Application No. 10-2023-0081316 filed on Jun. 23, 2023, in the Korean Intellectual Property Office, the disclosures of which are incorporated by reference herein in their entireties.

TECHNICAL FIELD

Embodiments of the present disclosure described herein relate to a display device with improved reliability, an electronic device including the same, and a method for driving the electronic device.

DISCUSSION OF RELATED ART

An electronic device may include a host processor, a driving controller, and a display panel. The host processor may provide input image data to the driving controller. In turn, the driving controller may process the input image data to generate a data signal. The host processor and the driving controller may be connected to each other via a specified interface. The host processor may include a data transmitter circuit, which facilitates the transfer of frame data from the host processor to the driving controller.

SUMMARY

Embodiments of the present disclosure provide a display device with improved reliability, an electronic device including the same, and a method for driving the electronic device.

According to an embodiment of the present disclosure, there is provided an electronic device including: a host processor configured to generate a first clock signal and to output frame data and a synchronization signal, wherein the synchronization signal toggles based on the first clock signal; a driving controller connected to the host processor, and configured to receive the synchronization signal and the frame data from the host processor and to generate a control signal based on a second clock signal; and a display panel configured to be driven based on the control signal, wherein the driving controller synchronizes the second clock signal with the first clock signal based on the synchronization signal, wherein the driving controller includes an error detector configured to detect an error of the synchronization signal, wherein the error is one of an initial synchronization fail error indicating that the driving controller did not receive the synchronization signal and a synchronization loss error indicating that a portion of the synchronization signal was omitted, and wherein the error detector outputs a first signal when the error is the initial synchronization fail error and outputs a second signal different from the first signal when the error is the synchronization loss error.

The error detector includes: a first counter configured to check whether the synchronization signal is received at a first point in time and to count a fail time during which the synchronization signal is not received; and a first comparator configured to compare the fail time with an initial time after the first point in time and to output the first signal when the fail time is greater than the initial time.

The first point in time is a point in time when the driving controller switches from a sleep in mode to a sleep out mode.

The error detector includes: a second counter configured to count the number of continuous loss toggles of the synchronization signal, wherein a loss toggle corresponds to when the synchronization signal does not toggle; and a second comparator configured to compare the number of loss toggles with a predetermined value and to output the second signal when the number of loss toggles is greater than the predetermined value.

When the number of loss toggles is smaller than the predetermined value, the second comparator does not output the second signal.

The driving controller further includes a signal output circuit configured to generate an error flag signal when the first signal or the second signal is generated and to output the error flag signal to the host processor.

When the host processor receives the error flag signal, the host processor initializes the driving controller through a reset signal output to the driving controller.

When the driving controller is initialized, the error flag signal is not output.

When the first signal is output from the error detector, the driving controller is initialized and operates in a sleep in mode.

When the driving controller operates in the sleep in mode, the error detector does not output the first signal.

The driving controller and the host processor communicate with each other through a Mobile Industry Processor Interface (MIPI).

The driving controller outputs a tearing signal to control a transfer period of the frame data to the host processor.

The driving controller controls a period of the tearing signal.

The frame data includes a vertical active area and a vertical blank area, and the host processor controls a size of the vertical blank area.

According to an embodiment of the present disclosure, there is provided a display device including: a driving controller configured to receive a clock signal, frame data, and a synchronization signal that toggles and to output a scan driving signal, a data driving signal, and an output image signal; and a display panel controlled by the driving controller, wherein the driving controller includes an error detector configured to detect an error of the synchronization signal, wherein the error is an initial synchronization fail error indicating that the driving controller failed to receive the synchronization signal or a synchronization loss error indicating that a portion of the synchronization signal was omitted, and wherein the error detector outputs a first signal when the error is the initial synchronization fail error and outputs a second signal different from the first signal when the error is the synchronization loss error.

The error detector includes: a first counter configured to check whether the synchronization signal is received at a first point in time and to count a fail time during which the synchronization signal is not received; and a first comparator configured to compare the fail time with an initial time after the first point in time and to output the first signal when the fail time is greater than the initial time.

The error detector includes: a second counter configured to count the number of continuous loss toggles of the synchronization signal, wherein a loss toggle corresponds to when the synchronization signal does not toggle; and a second comparator configured to compare the number of loss toggles with a predetermined value and to output the second signal when the number of loss toggles is greater than the predetermined value.

The driving controller further includes a signal output circuit configured to generate an error flag signal when the first signal or the second signal is received and to output the error flag signal.

When the first signal is output from the error detector, the driving controller is initialized and operates in a sleep in mode.

When the driving controller operates in the sleep in mode, the error detector does not output the first signal.

According to an embodiment of the present disclosure, there is provided a method for driving an electronic device which includes a host processor and a driving controller communicating with each other through a MIPI, the method including: receiving, at the driving controller, a synchronization signal from the host processor to synchronize a second clock signal of the driving controller with a first clock signal of the host processor; and detecting, at an error detector of the driving controller, an error of the synchronization signal, wherein the error includes an initial synchronization fail error indicating that the driving controller did not receive the synchronization signal or a synchronization loss error indicating that a portion of the synchronization signal was omitted, and wherein the detecting of the error of the synchronization signal includes: outputting a first signal when the error is the initial synchronization fail error; and outputting a second signal different from the first signal when the error is the synchronization loss error.

The outputting of the first signal includes: checking whether the synchronization signal is received with respect to a first point in time; and when the synchronization signal is not received within an initial time from the first point in time, generating the first signal.

The first point in time is a point in time when the driving controller switches from a sleep in mode to a sleep out mode.

The outputting of the second signal includes: counting the number of continuous loss toggles of the synchronization signal; and when the number of loss toggles is greater than a predetermined value, generating the second signal.

The method may further include when the first signal or the second signal is generated, generating, at the driving controller, an error flag signal to be output to the host processor.

The method may further include when the host processor receives the error flag signal, initializing, at the host processor, the driving controller based on a reset signal.

The method may further include when the first signal is output, operating, at the driving controller, in a sleep in mode.

BRIEF DESCRIPTION OF THE DRAWINGS

The above and other features of the present disclosure will become apparent by describing in detail embodiments thereof with reference to the accompanying drawings.

DETAILED DESCRIPTION OF THE EMBODIMENTS

Figure 1:
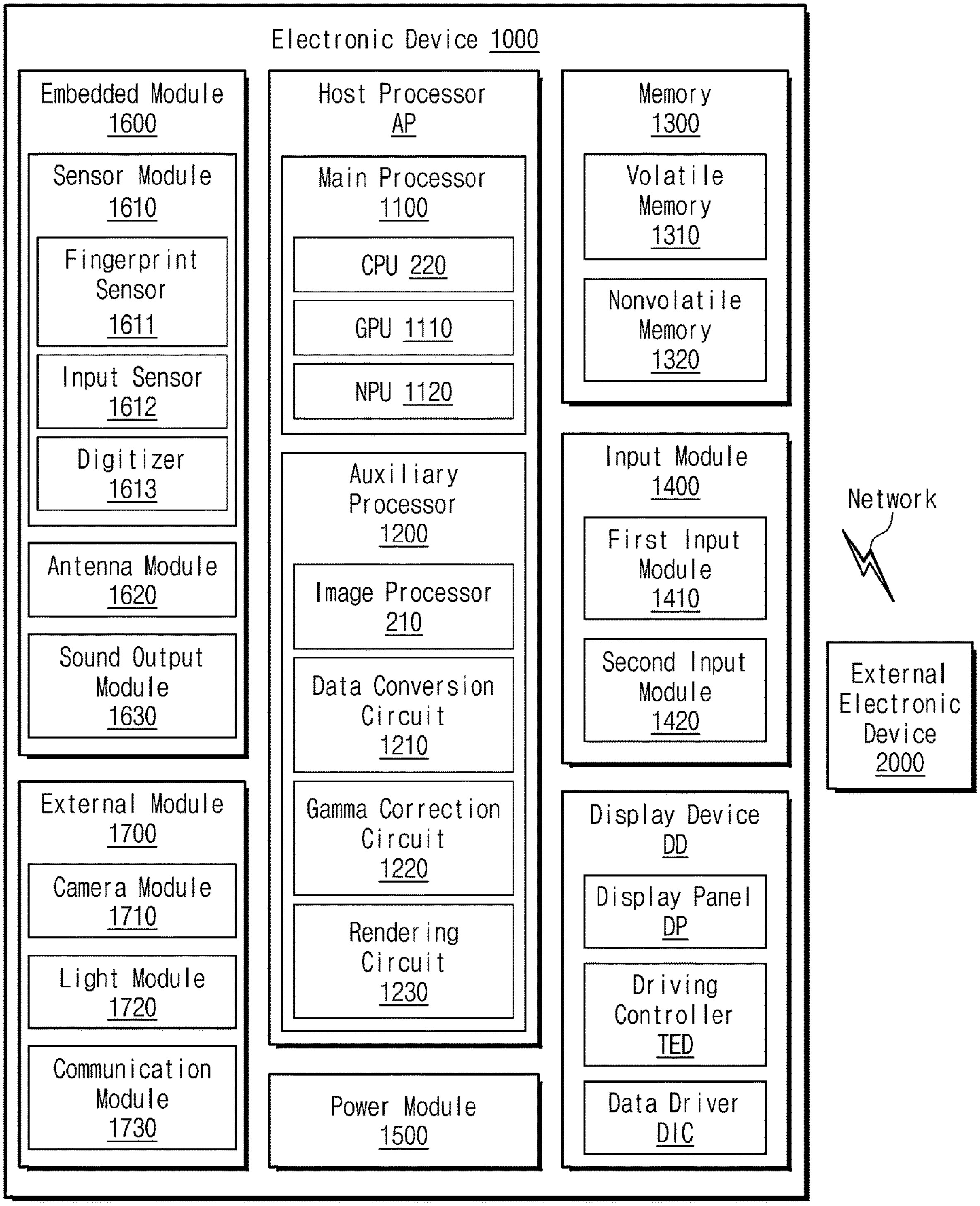
FIG. 1 is a block diagram of an electronic device according to an embodiment of the present disclosure.

In this specification, the expression that a first component (or area, layer, part, portion, etc.) is “on”, “connected with”, or “coupled to” a second component may mean that the first component is directly on, connected with, or coupled to the second component or may mean that a third component is disposed therebetween.

Like reference numerals may refer to like components. In addition, in the drawings, the thickness, ratio, and dimension of components may be exaggerated for an effective description of technical contents. The term “and/or” includes one or more combinations in each of which associated elements are defined.

Although the terms “first”, “second”, etc. may be used to describe various components, the components should not be construed as being limited by the terms. The terms are used to distinguish one component from another component. For example, a first component may be referred to as a “second component”, and similarly, the second component may be referred to as the “first component”. The articles “a”, “an”, and “the” are singular in that they have a single referent, but the use of the singular form in the specification should not preclude the presence of more than one referent.

In addition, the terms “under”, “below”, “on”, “above”, etc. are used to describe the correlation of components illustrated in the drawings. The terms that are relative in concept are described based on a direction shown in the drawings.

It will be further understood that the terms “comprises”, “includes”, “have”, etc. specify the presence of stated features, numbers, steps, operations, elements, components, or a combination thereof but do not preclude the presence or addition of one or more other features, numbers, steps, operations, elements, components, or a combination thereof.

Unless otherwise defined, all terms (including technical terms and scientific terms) used in the specification have the same meaning as commonly understood by one skilled in the art to which the present disclosure belongs. Furthermore, terms such as terms defined in commonly used dictionaries should be interpreted as having a meaning consistent with their meaning in the context of the related technology, and should not be interpreted in ideal or overly formal meanings unless explicitly defined herein.

Below, embodiments of the present disclosure will be described with reference to the drawings.

FIG. 1 is a block diagram of an electronic device according to an embodiment of the present disclosure.

Referring to FIG. 1, an electronic device 1000 outputs a variety of information through a display device DD in an operating system. When a host processor AP executes an application stored in a memory 1300, the display device DD provides a user with application information through a display panel DP.

The host processor AP obtains an external input through an input module 1400 or a sensor module 1610 and executes an application corresponding to the external input. For example, when the user selects a camera icon displayed in the display panel DP, the host processor AP obtains the user input through an input sensor 1612 and activates a camera module 1710. The host processor AP transfers image data corresponding to a photographed image obtained through the camera module 1710 to the display device DD. The display device DD may display an image corresponding to the photographed image through the display panel DP.

As another example, when authentication for personal information is performed in the display device DD, a fingerprint sensor 1611 obtains the input fingerprint information as input data. The host processor AP compares the input data obtained through the fingerprint sensor 1611 with authentication data stored in the memory 1300 and executes an application depending on a result of this comparison. The display device DD may display information executed depending on logic of the application, through the display panel DP.

As another example, when the user selects a music streaming icon displayed in the display device DD, the host processor AP obtains the user input through the input sensor 1612 and activates a music streaming application stored in the memory 1300. When a music play command is input to the music streaming application, the host processor AP activates a sound output module 1630 and provides the user with sound information corresponding to the music play command.

The operation of the electronic device 1000 is briefly described above. Below, a configuration of the electronic device 1000 will be described in detail. Some of components of the electronic device 1000 to be described later may be integrally implemented with one component, and the one component may be divided into two or more components.

Referring to FIG. 1, the electronic device 1000 may communicate with an external electronic device 2000 over a network (e.g., a short-range wireless communication network or a long-range wireless communication network). According to an embodiment, the electronic device 1000 may include the host processor AP, the memory 1300, the input module 1400, the display device DD, a power module 1500, an embedded module (or an internal module) 1600, and an external module 1700. According to an embodiment, the electronic device 1000 may not include at least one of the above components or may further include one or more other components. According to an embodiment, some of the above components (e.g., the sensor module 1610, an antenna module 1620, or the sound output module 1630) may be integrated into any other component (e.g., the display device DD).

The host processor AP may execute software to control at least one component (e.g., a hardware or software component) of the electronic device 1000 connected with the host processor AP and may perform various data processing or operations. According to an embodiment, as at least a part of the data processing or operations, the host processor AP may store a command or data received from any other component (e.g., the input module 1400, the sensor module 1610, or a communication module 1730) in a volatile memory 1310, may process the command or data stored in the volatile memory 1310, and may store the processed data in a nonvolatile memory 1320.

The host processor AP may include a main processor 1100 and an auxiliary processor 1200. The main processor 1100 may include one or more of a central processing unit (CPU) 220 or an application processor (AP). The main processor 1100 may further include one or more of a graphic processing unit (GPU) 1110, a communication processor (CP), and an image signal processor (ISP). The main processor 1100 may further include a neural processing unit (NPU) 1120. The neural processing unit 1120 may be a processor specialized for processing an artificial intelligence model. The artificial intelligence model may be created through machine learning. The artificial intelligence model may include a plurality of artificial neural network layers. The artificial neural network may include one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but the present disclosure is not limited thereto. Additionally or alternatively, the artificial intelligence model may include a software structure in addition to a hardware structure. At least two of the above processing units and processors may be integrally implemented with one component (e.g., a single chip), or each of the above processing units and processors may be implemented with an independent component (e.g., a plurality of chips).

The auxiliary processor 1200 may include an image processor 210, a data conversion circuit 1210, a gamma correction circuit 1220, and a rendering circuit 1230. The image processor 210 may convert and output a data format of image data.

The data conversion circuit 1210 may receive image data from a driving controller TED. The data conversion circuit 1210 may compensate for the image data, ensuring that an image is displayed with a desired luminance. This adjustment is based on either a characteristic of the electronic device 1000 or user settings. Additionally, the data conversion circuit 1210 may convert the image data to reduce power consumption or to compensate for afterimages. The gamma correction circuit 1220 may convert the image data or the gamma reference voltage such that an image displayed on the electronic device 1000 has a desired gamma characteristic. The rendering circuit 1230 may receive the image data from the driving controller TED and may render the image data in consideration of a pixel arrangement of the display panel DP. At least one of the data conversion circuit 1210, the gamma correction circuit 1220, and the rendering circuit 1230 may be integrated into any other component (e.g., the main processor 1100 or the driving controller TED). At least one of the data conversion circuit 1210, the gamma correction circuit 1220, and the rendering circuit 1230 may be integrated into a data driver DIC to be described later.

The memory 1300 may store various data used by at least one component (e.g., the host processor AP or the sensor module 1610) of the electronic device 1000 and input data or output data for commands related thereto. The memory 1300 may include at least one of the volatile memory 1310 and the nonvolatile memory 1320.

The input module 1400 may receive a command or data to be used by a component (e.g., the host processor AP, the sensor module 1610, or the sound output module 1630) of the electronic device 1000 from the outside of the electronic device 1000 (e.g., the user or the external electronic device 2000).

The input module 1400 may include a first input module 1410 to which a command or data are input from the user and a second input module 1420 to which a command or data are input from the external electronic device 2000. The first input module 1410 may include a microphone, a mouse, a keyboard, a key (e.g., a button), or a pen (e.g., a passive pen or an active pen). The second input module 1420 may support a specified protocol, enabling it to connect to the external electronic device 2000 either through wired or wireless means. According to one embodiment, the second input module 1420 may include a high definition multimedia interface (HDMI), a universal serial bus (USB) interface, a secure digital (SD) card interface, or an audio interface. The second input module 1420 may include a connector capable of being physically connected with the external electronic device 2000, for example, an HDMI connector, a USB connector, an SD card connector, or an audio connector (e.g., a headphone connector).

The display device DD may visually provide information to the user. The display device DD may include the display panel DP, the driving controller TED, and the data driver DIC. The display device DD may further include a window, a chassis, and a bracket to protect the display panel DP. The display device DD may further include an emission driving circuit, a voltage generator, etc. The display device DD will be described later.

The power module 1500 supplies a power to the components of the electronic device 1000. The power module 1500 may include a battery that charges a power supply voltage. The battery may include a primary cell that is not recharged, a secondary cell that is rechargeable, or a fuel cell. The power module 1500 may include a power management integrated circuit (PMIC). The PMIC supplies a power optimized for each of the modules described above and modules to be described later. The PMIC may supply an optimized power to each of the components described above and components to be described later. The power module 1500 may include a wireless power transmission/reception member electrically connected with the battery. The wireless power transmission/reception member may include a plurality of antenna radiators that are in the form of a coil.

The electronic device 1000 may further include the embedded module 1600 and the external module 1700. The embedded module 1600 may include the sensor module 1610, the antenna module 1620, and the sound output module 1630. The external module 1700 may include the camera module 1710, a light module 1720, and the communication module 1730.

The sensor module 1610 may sense an input by a user's body or an input by a pen among the first input module 1410 and may generate an electrical signal or a data value corresponding to the input. The sensor module 1610 may include at least one or more of the fingerprint sensor 1611, the input sensor 1612, and a digitizer 1613.

The fingerprint sensor 1611 may generate a data value corresponding to the user's fingerprint. The fingerprint sensor 1611 may include one of an optical fingerprint sensor or a capacitive fingerprint sensor.

The input sensor 1612 may generate a data value corresponding to coordinate information of the input by the user's body or the input by the pen. The input sensor 1612 generates a capacitance change due to the input as a data value. The input sensor 1612 may sense the input by the passive pen or may exchange data with the active pen.

The input sensor 1612 may measure a biometric signal such as blood pressure, moisture, or body fat. For example, when the user touches his/her body part to a sensor layer or a sensing panel and does not move during a given time period, the input sensor 1612 may detect the biometric signal based on a change in an electric field caused by the body part and may output this information to the display device DD.

The digitizer 1613 may generate a data value corresponding to the coordinate information of the input by the pen. The digitizer 1613 generates the amount of electromagnetic change by the input as a data value. The digitizer 1613 may sense the input by the passive pen or may exchange data with the active pen.

At least one of the fingerprint sensor 1611, the input sensor 1612, and the digitizer 1613 may be implemented with a sensor layer formed on the display panel DP through a continuous process. The fingerprint sensor 1611, the input sensor 1612, and the digitizer 1613 may be disposed above/on the display panel DP, and at least one of the fingerprint sensor 1611, the input sensor 1612, and the digitizer 1613, for example, the digitizer 1613, may be disposed below/under the display panel DP.

At least two or more of the fingerprint sensor 1611, the input sensor 1612, and the digitizer 1613 may be integrally formed with one sensing panel through the same process. When they are integrally formed with one sensing panel, the sensing panel may be disposed between the display panel DP and the window disposed above/on the display panel DP. According to one embodiment, the sensing panel may be disposed on the window, and the location of the sensing panel is not specifically limited.

At least one of the fingerprint sensor 1611, the input sensor 1612, and the digitizer 1613 may be embedded in the display panel DP. For example, at least one of the fingerprint sensor 1611, the input sensor 1612, and the digitizer 1613 may be simultaneously formed through a process of forming elements (e.g., a light emitting device and transistors) included in the display panel DP.

In addition, the sensor module 1610 may generate an electrical signal or a data value corresponding to an internal state or an external state of the electronic device 1000. The sensor module 1610 may further include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 1620 may include one or more antennas to transmit or receive the signal or power to or from an external source. According to an embodiment, using an antenna suitable for a communication method, the communication module 1730 may transmit a signal to the external electronic device 2000 or may receive a signal from the external electronic device 2000. An antenna pattern of the antenna module 1620 may be integrated with one component (e.g., the display panel DP) of the display device DD or the input sensor 1612.

The sound output module 1630 that is a device for outputting a sound signal to the outside of the electronic device 1000 may include, for example, a speaker used for general purposes such as multimedia playback or recording playback and a receiver used exclusively for receiving calls. According to an embodiment, the receiver and the speaker may be either integrally or separately implemented. A sound output pattern of the sound output module 1630 may be integrated with the display device DD.

The camera module 1710 may photograph a still image and a moving image. According to one embodiment, the camera module 1710 may include one or more lenses, an image sensor, or an image signal processor. The camera module 1710 may further include an infrared camera capable of measuring the presence or absence of the user, the location of the user, and the line of sight of the user.

The light module 1720 may provide light. The light module 1720 may include a light emitting diode or a xenon lamp. The light module 1720 may operate in conjunction with the camera module 1710 or may operate independently.

The communication module 1730 may establish a wired or wireless communication channel between the electronic device 1000 and the external electronic device 2000. The communication module 1730 may also facilitate and manage communication activities over the established communication channel. The communication module 1730 may include one of a wireless communication module, such as a cellular communication module, a short-range wireless communication module, or a global navigation satellite system (GNSS) communication module, and a wired communication module, such as a local area network (LAN) communication module or a power line communication module or may include all of these modules. The communication module 1730 may communicate with the external electronic device 2000 over a short-range communication network such as Bluetooth, Wi-Fi direct, or infrared data association (IrDA) or a long-range communication network such as a cellular network, an Internet, or a computer network (e.g., a LAN or WAN). Various kinds of communication modules described above may be implemented with one chip or with separate chips, respectively.

The input module 1400, the sensor module 1610, the camera module 1710, etc. may be used to control the operation of the display device DD in conjunction with the host processor AP.

The host processor AP outputs commands or data to the display device DD, the sound output module 1630, the camera module 1710, or the light module 1720 based on the input data received from the input module 1400. For example, the host processor AP may generate the image data corresponding to the input data applied through the mouse or the active pen and may output the image data to the display device DD. An another example, the host processor AP may generate command data corresponding to the input data and may output the command data to the camera module 1710 or the light module 1720. When input data are not received from the input module 1400 during a given time period, the host processor AP may switch an operating mode of the electronic device 1000 to a low-power mode or a sleep mode such that the power consumption of the electronic device 1000 is reduced.

The host processor AP outputs commands or data to the display device DD, the sound output module 1630, the camera module 1710, or the light module 1720 based on the sensing data received from the sensor module 1610. For example, the host processor AP may compare authentication data obtained through the fingerprint sensor 1611 with authentication data stored in the memory 1300 and may then execute an application depending on a result of the comparison. The host processor AP may execute a command based on the sensing data sensed by the input sensor 1612 or the digitizer 1613 or may output image data corresponding to the sensing data to the display device DD. When the sensor module 1610 includes a temperature sensor, the host processor AP may receive temperature data associated with the measured temperature from the sensor module 1610 and may further perform luminance correction on the image data based on the temperature data.

The host processor AP may receive measurement data about the presence or absence of the user, the location of the user, and the line of sight of the user from the camera module 1710. The host processor AP may further perform the luminance correction on the image data based on the measurement data. For example, the host processor AP that determines the presence or absence of the user through the input from the camera module 1710 may provide image data whose luminance is corrected through the data conversion circuit 1210 or the gamma correction circuit 1220 to the display device DD.

Some of the above components may be connected with each other through a communication scheme between peripheral devices, for example, a bus, a general purpose input/output (GPIO), a serial peripheral interface (SPI), a mobile industry processor interface (MIPI), or an ultra-path interconnect (UPI) link and may exchange signals (e.g., commands or data). The host processor AP may communicate with the display device DD through a given interface. For example, one of the communication methods described above may be used, and the present disclosure is not limited thereto.

The electronic device 1000 according to various embodiments of the present disclosure may be implemented as various types of devices. The electronic device 1000 may include, for example, at least one of a portable communication device (e.g., a smartphone), a computer device, a portable multimedia device, a portable medical device, a camera, a wearable device, and home appliances. The electronic device 1000 according to an embodiment of the present disclosure is not limited to the above devices.

Figure 2:
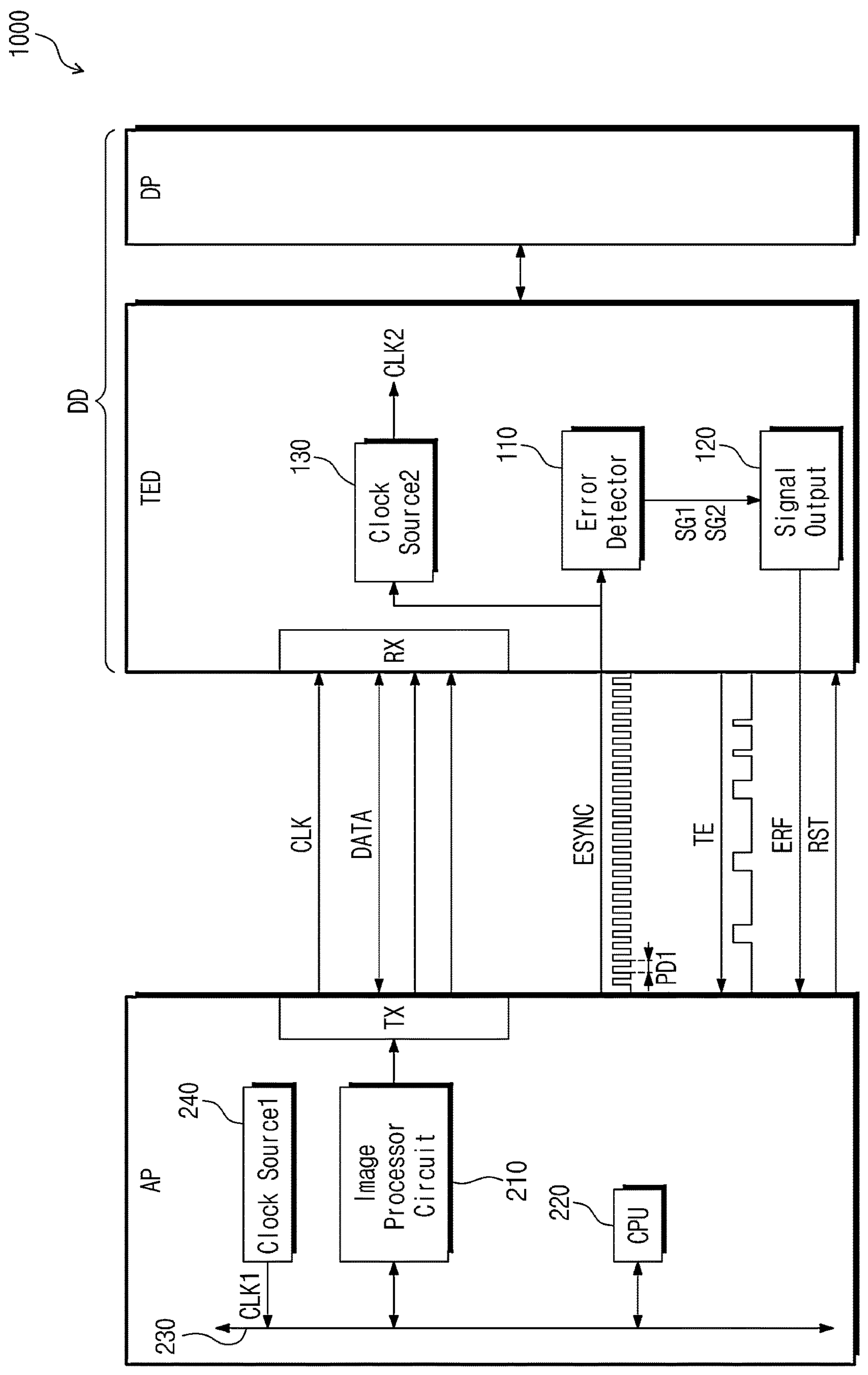
FIG. 2 is a block diagram of an electronic device according to an embodiment of the present disclosure.

FIG. 2 is a block diagram of an electronic device according to an embodiment of the present disclosure.

Referring of the FIG. 2, the electronic device 1000 may be a device that is activated by an electrical signal. The electronic device 1000 may process image data and may display the processed image data through the display panel DP.

The electronic device 1000 may include the host processor AP and the display device DD. The display device DD may include the driving controller TED and the display panel DP.

The host processor AP may be implemented with an integrated circuit, a system-on-chip, an application processor, or a mobile application processor, but the present disclosure is not limited thereto. The host processor AP may control various components included in the electronic device 1000, for example, the driving controller TED.

The host processor AP and the driving controller TED may be connected to each other through a given interface. The given interface may include a mobile industry processor interface (MIPI).

The MIPI may be driven in a command mode and a video mode.

In the command mode, the driving controller TED may output a first tearing signal to the host processor AP. The first tearing signal may be generated based on a vertical synchronization signal. The first tearing signal may be referred to as a "tearing effect (TE) signal". The first tearing signal is an example of a signal capable of preventing the tearing effect. The tearing effect may refer to a visual artifact on the display panel DP. The host processor AP may output first frame data to the driving controller TED. The transfer of the first frame data may be controlled by the first tearing signal.

The first frame data may include only image data. When the display panel DP is set to display a still image, the driving controller TED may periodically read the image data stored in a frame memory. The driving controller TED may then output the read image data to the display panel DP according to a timing determined by the driving controller TED.

The video mode may include a first video mode and a second video mode.

In the first video mode, the host processor AP may output second frame data to the driving controller TED. The second frame data may be transferred in the form of a packet.

The second frame data may include a vertical active area and a vertical blank area. The vertical active area may include image data. In the first video mode, the driving controller TED may not receive a tearing signal. When the display panel DP is set to display a video, the driving controller TED may output image data to the display panel DP according to a timing included in the second frame data. The driving controller TED may allow the display panel DP to operate at a first driving frequency. The first video mode may be referred to as a "normal mode".

In the second video mode, the driving controller TED may output a second tearing signal TE to the host processor AP. The second tearing signal TE may be generated based on the vertical synchronization signal. The second tearing signal TE may be referred to as an "adaptive refresh panel tearing effect (ARP-TE) signal". The host processor AP may output the second frame data to the driving controller TED. The transfer of the second frame data may be controlled by the second tearing signal TE. The driving controller TED may analyze the second frame data and may determine a second driving frequency of the display panel DP. The size of the vertical blank area of the second frame data may be controlled by the driving controller TED based on the second driving frequency. In the vertical blank area, the host processor AP and the driving controller TED may operate in a low-power mode. As such, power consumption of the electronic device 1000 may be reduced. The display panel DP may operate at the second driving frequency lower than the first driving frequency. Power consumption of the electronic device 1000 may be reduced. The second video mode may be referred to as an "adaptive refresh panel (ARP) mode". In this specification, a configuration in which the host processor AP and the driving controller TED operate in the second video mode is illustrated as an example. Below, the second tearing signal TE is referred to as a "tearing signal TE".

The host processor AP may include the image processor circuit 210, a data transmitter circuit TX, a central processing unit 220, a bus 230, and a first clock source 240.

The image processor 210 may convert image data to be appropriate for the format that the data transmitter circuit TX is capable of processing.

The data transmitter circuit TX may include one clock lane and one or more data lanes.

The clock lane may transmit a clock signal CLK. The clock signal CLK may be a signal that always toggles. The clock signal CLK may be generated based on a first clock signal CLK1 to be described later.

The data lane may transmit frame data "DATA". The frame data "DATA" may be transmitted by a two-way data lane or a one-way data lane.

The central processing unit 220 may allow the host processor AP to compress image data and to provide the compressed image data to the driving controller TED through the data transmitter circuit TX.

The central processing unit 220 may control the components of the host processor AP through the bus 230.

The first clock source 240 may generate the first clock signal CLK1 that always toggles. The first clock signal CLK1 may be used to drive various components in the host processor AP and to generate various signals. The first clock source 240 may include a ring oscillator, an RC oscillator, a crystal oscillator, or a temperature-compensated crystal oscillator. For example, the first clock source 240 may be the crystal oscillator.

The host processor AP may output a reset signal RST to the driving controller TED. The reset signal RST may be used to initialize the driving controller TED.

The host processor AP may output a synchronization signal ESYNC to the driving controller TED. The synchronization signal ESYNC may be generated based on the first clock signal CLK1 and may toggle at a given period PD1. In other words, the synchronization signal ESYNC may toggle at a specified period PD1. For example, the pulse width of the synchronization signal ESYNC may correspond to one horizontal period, and the given period PD1 may correspond to 2 horizontal periods.

The synchronization signal ESYNC may be a signal transmitted to synchronize the host processor AP and the driving controller TED. The host processor AP and the driving controller TED may synchronize the internal timing based on the synchronization signal ESYNC. For example, the synchronization signal ESYNC may be a signal corresponding to the horizontal synchronization signal that is used in the electronic device 1000. The synchronization signal ESYNC may be used in common in the host processor AP and the driving controller TED. For example, the synchronization signal ESYNC may be shared by the host processor AP and the driving controller TED.

The driving controller TED may control the display panel DP. The driving controller TED may be connected to the host processor AP in a specified interface mode. The driving controller TED may receive data, for example, the frame data "DATA" from the host processor AP and may generate image data DS (refer to FIG. 3) by converting the format of the frame data "DATA" to be appropriate for the interface specification of the display panel DP. The driving controller TED may provide the display panel DP with a scan control signal SCS (refer to FIG. 3), a data control signal DCS (refer to FIG. 3), the image data DS (refer to FIG. 3), etc. This will be described later.

The driving controller TED may include a data receiver circuit RX, an error detector 110, a signal output circuit 120, and a second clock source 130.

The data receiver circuit RX may include one clock lane and one or more data lanes. The data receiver circuit RX may be connected to the data transmitter circuit TX through the MIPI. The data receiver circuit RX may receive the clock signal CLK from the transmitter circuit TX.

The clock lane may receive the clock signal CLK. The clock lane of the data receiver circuit RX may correspond to the clock lane of the data transmitter circuit TX. The clock signal CLK may be provided to the second clock source 130. The second clock source 130 may synchronize a second clock signal CLK2 with the first clock signal CLK1 based on the clock signal CLK.

The data lanes may receive the frame data "DATA". The data lanes of the data receiver circuit RX may correspond to the data lanes of the data transmitter circuit TX. Thus, for example, the data receiver circuit RX may receive the frame data "DATA" from the transmitter circuit TX via the data lanes and vice versa.

The error detector 110 may receive the synchronization signal ESYNC. The error detector 110 may detect an error of the synchronization signal ESYNC. This will be described later.

When the error of the synchronization signal ESYNC is detected by the error detector 110, the signal output circuit 120 may generate an error flag signal ERF and may output the error flag signal ERF to the host processor AP. This will be described later.

The second clock source 130 may generate the second clock signal CLK2 that always toggles. The second clock signal CLK2 may be used to drive various components in the driving controller TED and to generate various signals. For example, the driving controller TED may generate a control signal CTRL (refer to FIG. 3) based on the second clock signal CLK2.

The second clock source 130 may include a ring oscillator, an RC oscillator, a crystal oscillator, or a temperature-compensated crystal oscillator. For example, the second clock source 130 may be the ring oscillator.

The second clock source 130 may synchronize the second clock signal CLK2 with the first clock signal CLK1 based on the clock signal CLK or the synchronization signal ESYNC. For example, the second clock source 130 may align the second clock signal CLK2 with the first clock signal CLK1.

The driving controller TED may output the tearing signal TE, which controls a transfer period of the frame data "DATA" to the host processor AP.

The driving controller TED may control a period of the tearing signal TE. For example, the driving controller TED may receive and analyze a command output from the host processor AP and may adjust the period of the tearing signal TE based on the command output from the host processor AP. The command output from the host processor AP may include information about the size of the vertical blank area of the frame data "DATA".

Unlike the present disclosure, while a host processor and a driving controller operate in the low-power mode, the driving controller may not receive a clock signal through a clock lane. When the low-power mode ends, there is a possibility of experiencing a phenomenon where the luminance of an image displayed on a display panel appears torn. This tearing effect can be attributed to a divergence in a horizontal synchronization signal, which is cause by a difference in clocks between the host processor and the driving controller. However, according to an embodiment of the present disclosure, the synchronization signal ESYNC may be continuously generated and provided to the driving controller TED regardless of the transfer of the frame data "DATA". For example, even when the frame data "DATA" are not transferred, the synchronization signal ESYNC may be provided from the host processor AP to the driving controller TED. The driving controller TED may synchronize the second clock signal CLK2 with the first clock signal CLK1 based on the synchronization signal ESYNC. Accordingly, a flicker due to a fine skew difference in the horizontal synchronization signal may be prevented. Additionally, the divergence of the horizontal synchronization signal that arises from the difference in the clocks between the host processor AP and the driving controller TED may be prevented. Accordingly, the electronic device 1000 with improved display quality and improved reliability may be provided.

The display panel DP may be a component that substantially generates an image. The display panel DP may include a plurality of pixels PX (refer to FIG. 3) and may display an image under control of the driving controller TED.

The display panel DP according to an embodiment of the present disclosure may be a light emitting display panel, but the present disclosure is not limited thereto. For example, the display panel DP may be an organic light emitting display panel, a quantum dot light emitting display panel, a micro-LED display panel, or a nano-LED display panel. An emission layer of the organic light emitting display panel may include an organic light emitting material. An emission layer of the quantum dot light emitting display panel may include a quantum dot, a quantum rod, or the like. An emission layer of the micro-LED display panel may include a micro-LED. An emission layer of the nano-LED display panel may include a nano-LED.

Figure 3:
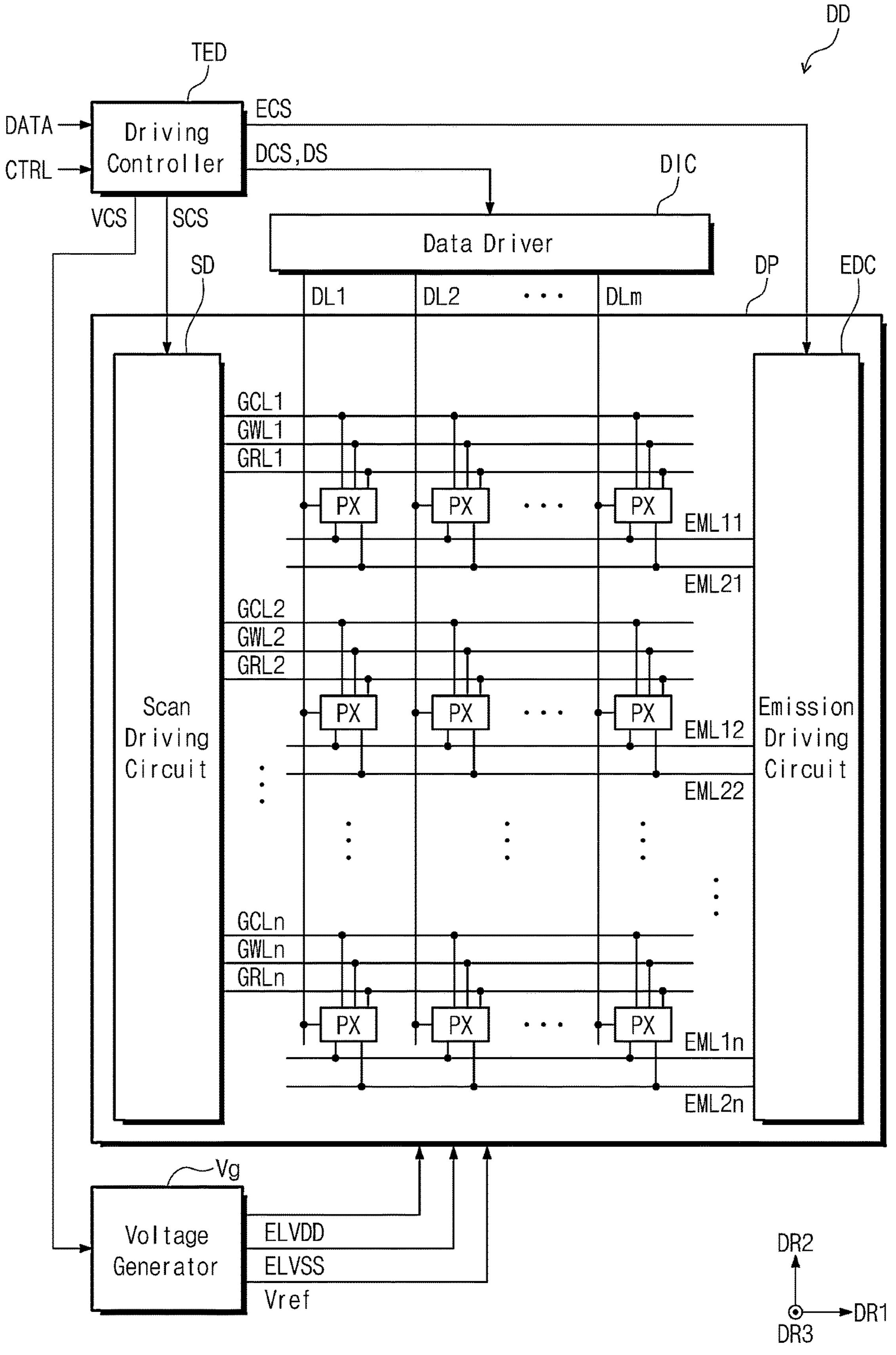
FIG. 3 diagram illustrating a display device according to an embodiment of the present disclosure.

FIG. 3 diagram illustrating a display device according to an embodiment of the present disclosure.

Referring to FIG. 3, the display device DD includes the display panel DP, the driving controller TED, the data driver DIC, and a voltage generator VG.

The driving controller TED may receive the frame data "DATA" and the control signal CTRL. The driving controller TED may generate the image data DS by converting the data format of the frame data "DATA" to be appropriate for the specification of the interface with the data driver DIC. The driving controller TED may output the scan control signal SCS, the data control signal DCS, an emission driving control signal ECS, and a voltage control signal VCS. The scan control signal SCS, the data control signal DCS, the emission driving control signal ECS, and the voltage control signal VCS may be collectively referred to as a "control signal".

The driving controller TED may receive frame data with a frequency determined by the host processor AP (refer to FIG. 1).

The data driver DIC receives the data control signal DCS and the image data DS from the driving controller TED. The data driver DIC may convert the image data DS into data signals and may output the data signals to a plurality of data lines DL1 to DLm, respectively. The data signals may refer to analog voltages corresponding to a grayscale value of the image data DS.

The driving controller TED and the data driver DIC may be integrally implemented, which may be referred to as a "timing controller embedded data driver".

In an embodiment of the present disclosure, during a driving period of one frame, the data driver DIC may output the data signal corresponding to the image data DS to the data lines DL1 to DLm, respectively.

The voltage generator VG may receive the voltage control signal VCS from the driving controller TED. The voltage generator VG may generate voltages necessary for an operation of the display panel DP. In an embodiment of the present disclosure, the voltage generator VG generates a first power supply voltage ELVDD, a second power supply voltage ELVSS, and a reference voltage Vref.

The display panel DP may include scan lines GCL1 to GCLn, GWL1 to GWLn, and GRL1 to GRLn, emission control lines EML11 to EML1*n* and EML21 to EML2*n*, the data lines DL1 to DLm, and the pixels PX. The display panel DP may further include a scan driving circuit SD and an emission driving circuit EDC.

The scan driving circuit SD may be disposed on a first side of the display panel DP. The scan lines GCL1 to GCLn, GWL1 to GWLn, and GRL1 to GRLn may extend from the scan driving circuit SD in a first direction DR1.

The emission driving circuit EDC may be disposed on a second side of the display panel DP. The emission control lines EML11 to EML1*n* and EML21 to EML2*n* may extend from the emission driving circuit EDC in a direction facing away from the first direction DR1.

The scan lines GCL1 to GCLn, GWL1 to GWLn, and GRL1 to GRLn and the emission control lines EML11 to EML1*n* and EML21 to EML2*n* may be spaced from each other in a second direction DR2.

The scan lines GCL1 to GCLn, GWL1 to GWLn, and GRL1 to GRLn may include the compensation scan lines GCL1 to GCLn, the write scan lines GWL1 to GWLn, and the initialization scan lines GRL1 to GRLn.

The emission control lines EML11 to EML1*n* and EML21 to EML2*n* may include the first emission control lines EML11 to EML1*n* and the second emission control lines EML21 to EML2*n*.

The data lines DL1 to DLm may extend from the data driver DIC in a direction facing away from the second direction DR2. In other words, the data lines DL1 to DLm may extend from the data driver DIC in a direction opposite the second direction DR2. The data lines DL1 to DLm may be spaced from each other in the first direction DR1.

In the example illustrated in FIG. 3, the scan driving circuit SD and the emission driving circuit EDC are arranged to face each other, with the pixels PX interposed therebetween. However, the present disclosure is not limited thereto. For example, the scan driving circuit SD and the emission driving circuit EDC may be disposed adjacent to each other on either the first side or the second side of the display panel DP. In an embodiment, the scan driving circuit SD and the emission driving circuit EDC may be implemented with one circuit.

The plurality of pixels PX may be electrically connected to the scan lines GCL1 to GCLn, GWL1 to GWLn, and GRL1 to GRLn, the emission control lines EML11 to EML1*n* and EML21 to EML2*n*, and the data lines DL1 to DLm. Each of the plurality of pixels PX may be electrically connected to three scan lines and two emission control lines.

Each of the plurality of pixels PX may include a light emitting element and a pixel circuit for controlling the emission of the light emitting element.

The light emitting element of each of the plurality of pixels PX may generate lights with different colors. For example, the pixels PX may include red pixels for generating a red light, green pixels for generating a green light, and blue pixels for generating a blue light. The light emitting element of the red pixel, the light emitting element of the green pixel, and the light emitting element of the blue pixel may respectively include emission layers of different materials.

The pixel circuit may include at least one transistor and at least one capacitor. This will be described later. The scan driving circuit SD and the emission driving circuit EDC may include transistors formed through the same process as the transistors of the pixel circuit.

Each of the plurality of pixels PX may receive the first power supply voltage ELVDD, the second power supply voltage ELVSS, and the reference voltage Vref from the voltage generator VG.

The scan driving circuit SD may receive the scan control signal SCS from the driving controller TED. The scan driving circuit SD may output scan signals to the scan lines GCL1 to GCLn, GWL1 to GWLn, and GRL1 to GRLn in response to the scan control signal SCS.

The emission driving circuit EDC may output emission control signals to the emission control lines EML11 to EML1*n* and EML21 to EML2*n* in response to the emission driving control signal ECS from the driving controller TED.

The driving controller TED according to an embodiment of the present disclosure may determine a driving frequency and may control the data driver DIC, the scan driving circuit SD, and the emission driving circuit EDC depending on the determined driving frequency.

Figure 4:
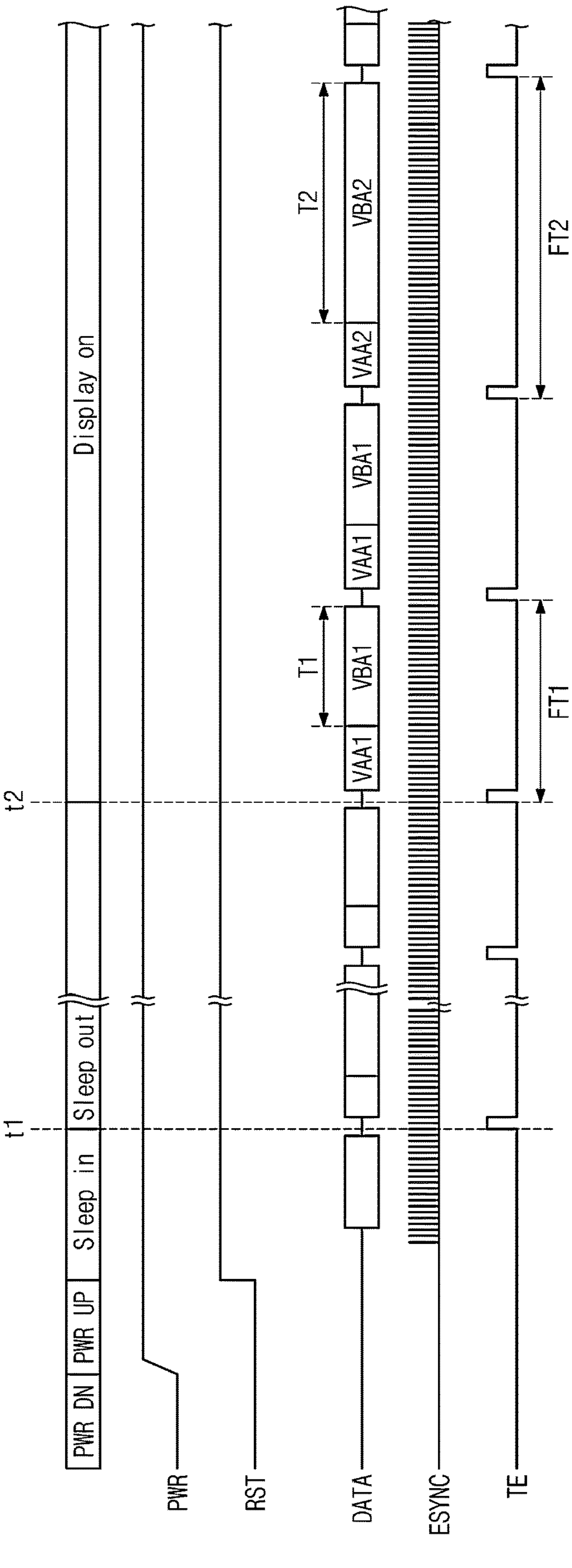
FIG. 4 is a timing diagram illustrating an operation of an electronic device according to an embodiment of the present disclosure.

FIG. 4 is a timing diagram illustrating an operation of an electronic device according to an embodiment of the present disclosure.

Referring to FIGS. 2 and 4, the driving controller TED may operate in an off mode PWR DN where a power is turned off.

The driving controller TED may receive a power signal PWR from the host processor AP. The power signal PWR may control the turn-on or turn-off of the driving controller TED.

When the power signal PWR is set to an active state, the driving controller TED may switch to an on mode PWR UP where the power is turned on and thus the driving controller TED may operate.

The host processor AP may output the reset signal RST to the driving controller TED. The reset signal RST may be used to initialize the driving controller TED. The reset signal RST may be activated after the power signal PWR is activated.

When the reset signal RST is set to the active state (e.g., a high level), the driving controller TED may switch from the on mode PWR UP to a sleep in mode Sleep in and thus the driving controller TED may operate.

In the sleep in mode Sleep in, the host processor AP may start to output the synchronization signal ESYNC to the driving controller TED. For example, the synchronization signal ESYNC may be output from a point in time when the driving controller TED enters the sleep in mode Sleep in.

Before the tearing signal TE is provided, e.g., before a first point in time t1, the host processor AP may output a sleep out command to the driving controller TED.

In response to the sleep out command, the driving controller TED may switch from the sleep in mode Sleep in to a sleep out mode Sleep out and thus the driving controller TED may operate. For example, the first point in time t1 may be a point in time when the driving controller TED switches from the sleep in mode Sleep in to the sleep out mode Sleep out.

The driving controller TED may operate after the sleep out mode Sleep out.

In the sleep out mode Sleep out, the driving controller TED may output the tearing signal TE to the host processor AP. The tearing signal TE may be generated based on the vertical synchronization signal. For example, the tearing signal TE may be output at the beginning of the sleep out mode Sleep out.

At a second point in time t2, the host processor AP may output a display on command that instructs the driving controller TED to output frame data stored in a buffer.

In response to the display on command, the driving controller TED may switch from the sleep out mode Sleep out to a display on mode Display on and may operate.

The frame data "DATA" may be transferred in the form of a packet. The packet of the frame data "DATA" may include a vertical active area VAA1/VAA2 and a vertical blank area VBA1/VBA2. The vertical active area VAA1/VAA2 may include image data.

The host processor AP may control the size of the vertical blank area VBA1/VBA2. The transfer timing of the frame data "DATA" may be adjusted depending on the size of the vertical blank area VBA1/VBA2.

The driving controller TED may receive and analyze the previous frame data "DATA" output from the host processor AP and may output a timing control signal corresponding to a result of the analysis.

The driving controller TED may adjust the period of the tearing signal TE based on the timing control signal and may provide the tearing signal TE with the adjusted period to the host processor AP.

The tearing signal TE may control the transmission period of the frame data "DATA". The host processor AP may control the transfer timing of the next frame data "DATA" to be provided to the driving controller TED depending on the tearing signal TE with the adjusted period.

For example, when the transfer of previous frame data ends, the driving controller TED may receive an end of frame (EOF) command from the host processor AP. When the scan of the previous frame data ends and the entire previous frame data are displayed on the display panel DP, the driving controller TED may generate an end of scan (EOS) command. The tearing signal TE may be generated to be activated when the EOF command for the previous frame data is received and the EOS command for the previous frame data is generated. The driving controller TED may provide the tearing signal TE to the host processor AP. The host processor AP may output next frame data in response to the tearing signal TE.

The first frame data among the pieces of frame data "DATA" may include the first vertical active area VAA1 and the first vertical blank area VBA1. The first vertical blank area VBA1 may have a first size T1. The second frame data among the pieces of frame data "DATA" may include the second vertical active area VAA2 and the second vertical blank area VBA2. The size of the second vertical blank area VBA2 may be larger than the size of the first vertical blank area VBA1. The second vertical blank area VBA2 may have a second size T2.

The host processor AP may output the first frame data in response to the tearing signal TE. The first frame data may have a first driving frequency FT1. For example, the first driving frequency FT1 may be 120 Hz (Hertz).

The host processor AP may output the second frame data in response to the tearing signal TE. The second frame data may have a second driving frequency FT2. The host processor AP may increase the size of the second vertical blank area VBA2 to control the transfer timing of frame data to be provided to the driving controller TED. The second driving frequency FT2 may be lower than the first driving frequency FT1. For example, the second driving frequency FT2 may be 60 Hz.

According to an embodiment of the present disclosure, when the second frame data are output, the display panel DP may operate at the second driving frequency FT2 lower than the first driving frequency FT1. Power consumption of the electronic device 1000 may be reduced.

In addition, according to an embodiment of the present disclosure, during the first and second vertical blank areas VBA1 and VBA2, the host processor AP and the driving controller TED may operate in the low-power mode. In the low-power mode, the host processor AP may not provide the clock signal CLK and the frame data "DATA" to the driving controller TED. As such, power consumption of the electronic device 1000 may be reduced.

The synchronization signal ESYNC may be continuously generated and provided to the driving controller TED regardless of the low-power mode. For example, even in the case where the host processor AP operates in the low-power mode and does not provide the first clock signal CLK1 to the driving controller TED, the synchronization signal ESYNC may be provided to the driving controller TED.

According to an embodiment of the present disclosure, the driving controller TED may synchronize the second clock signal CLK2 with the first clock signal CLK1 based on the synchronization signal ESYNC. As such, a flicker due to a fine skew difference of the horizontal synchronization signal may be prevented. Additionally, the divergence of the horizontal synchronization signal due to the clock variation difference between the host processor AP and the driving controller TED may be prevented. Accordingly, the electronic device 1000 with improved display quality and improved reliability may be provided.

Figure 5:
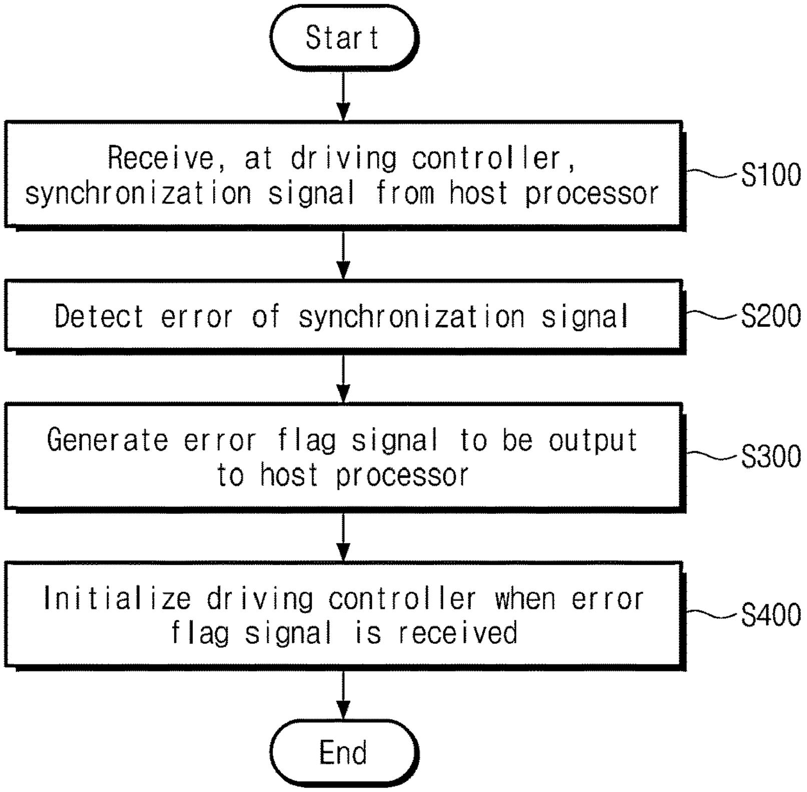
FIG. 5 is a flowchart illustrating a method for driving an electronic device according to an embodiment of the present disclosure.
Figure 6:
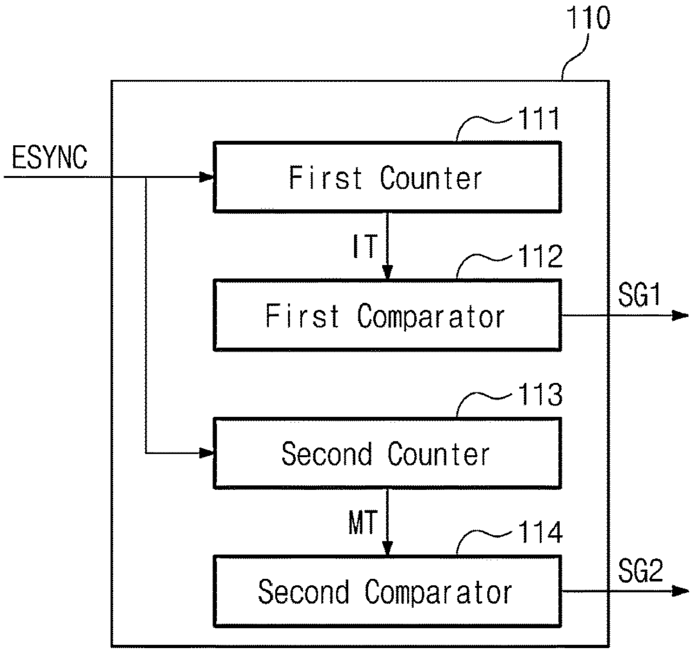
FIG. 6 is a diagram illustrating an error detector according to an embodiment of the present disclosure.

FIG. 5 is a flowchart illustrating a method for driving an electronic device according to an embodiment of the present disclosure, and FIG. 6 is a diagram illustrating an error detector according to an embodiment of the present disclosure.

Referring to FIGS. 2, 5, and 6, the host processor AP and the driving controller TED may communicate through the MIPI.

The driving controller TED may receive the synchronization signal ESYNC from the host processor AP to synchronize the second clock signal CLK2 of the driving controller TED with the first clock signal CLK1 of the host processor AP (S100).

The error detector 110 of the driving controller TED may detect an error of the synchronization signal ESYNC (S200).

The error may include an initial synchronization fail error which indicates that the driving controller TED did not receive the activated synchronization signal ESYNC and a synchronization loss error which indicates that a portion of the synchronization signal ESYNC was omitted. This will be described later.

When the detected error corresponds to the initial synchronization fail error, the error detector 110 may output a first signal SG1. When the detected error corresponds to the synchronization loss error, the error detector 110 may output a second signal SG2 different from the first signal SG1.

The error detector 110 may include a first counter 111, a first comparator 112, a second counter 113, and a second comparator 114.

The first counter 111 may receive the synchronization signal ESYNC. The first counter 111 may check whether the synchronization signal ESYNC is received at a given point in time and may count a fail time IT during which the synchronization signal ESYNC is not received. The first counter 111 may output the fail time IT. The given point in time may be the first point in time t1, e.g., the point in time t1 (refer to FIG. 4) when the driving controller TED receives the sleep out command.

The first comparator 112 may receive the fail time IT. After the given point in time, the first comparator 112 may compare the fail time IT from the first counter 111 with a given initial time. When the fail time IT is greater than the initial time, the first comparator 112 may output the first signal SG1. The initial time is a time that is predetermine, and the present disclosure is not limited thereto. For example, the initial time may be 16 ms (millisecond).

The first counter 111 and the first comparator 112 may detect the error of the synchronization signal ESYNC due to the initial synchronization fail error.

The second counter 113 may count the number of continuous loss toggles MT of the synchronization signal ESYNC. The second counter 113 may output the number of loss toggles MT. The number of continuous loss toggles MT of the synchronization signal ESYNC may refer to the number of times the toggling of the synchronization signal ESYNC is not recognized.

The second comparator 114 may receive the number of loss toggles MT. The second comparator 114 may compare the number of loss toggles MT with a predetermined value. When the number of loss toggles MT is greater than the predetermined value, the second comparator 114 may output the second signal SG2. The predetermined value may be a predetermined number of toggles, and the present disclosure is not limited thereto. For example, the predetermined value may be 8 ea.

The second counter 113 and the second comparator 114 may detect the error of the synchronization signal ESYNC due to the synchronization loss error.

When the first signal SG1 or the second signal SG2 is generated, the driving controller TED may generate the error flag signal ERF (refer to FIG. 7) to be output to the host processor AP (S300).

When the host processor AP receives the error flag signal ERF (refer to FIG. 7), the host processor AP may initialize the driving controller TED (S400). Alternatively, regardless of the error flag signal ERF (refer to FIG. 7), the driving controller TED may be automatically initialized depending on whether the first signal SG1 and/or the second signal SG2 is output.

Figures 7, 8:
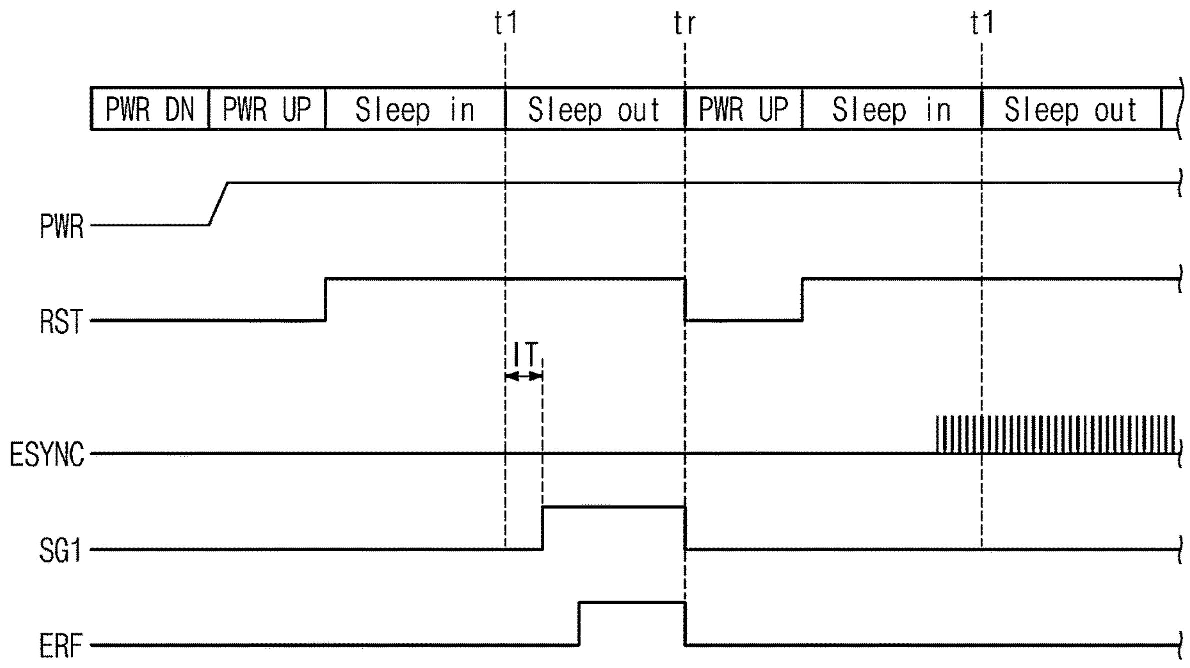
FIG. 7 is a timing diagram illustrating an operation of an electronic device according to an embodiment of the present disclosure.
FIG. 8 is a diagram illustrating an initial time code according to an embodiment of the present disclosure.

FIG. 7 is a timing diagram illustrating an operation of an electronic device according to an embodiment of the present disclosure, and FIG. 8 is a diagram illustrating an initial time code according to an embodiment of the present disclosure. In the description of FIG. 7, the components that are described with reference to FIG. 4 are marked by the same reference numerals/signs, and thus, an additional description will be omitted to avoid redundancy.

FIG. 7 shows an operation of an electronic device when an initial synchronization fail error occurs.

Referring to FIGS. 2, 6, 7, and 8, the driving controller TED may sequentially operate in the off mode PWR DN, the on mode PWR UP, the sleep in mode Sleep in, and the sleep out mode Sleep out.

An error in which the activated synchronization signal ESYNC is not provided from the host processor AP to the driving controller TED may occur during the operation of the electronic device 1000. The case where the driving controller TED fails to receive the activated synchronization signal ESYNC may be referred to as the case where the initial synchronization fail error occurs.

The initial synchronization fail error may occur due to various reasons or in various situations. For example, the initial synchronization fail error may occur where the activated synchronization signal ESYNC is not provided from the host processor AP. As another example, the initial synchronization fail error may occur where the activated synchronization signal ESYNC is provided after the sleep in mode Sleep in or the sleep out mode Sleep out due to a delay of the activated synchronization signal ESYNC.

The error detector 110 may detect the error of the synchronization signal ESYNC. The error detector 110 may operate after the sleep out mode Sleep out in which the driving controller TED operates.

The first counter 111 may check whether the synchronization signal ESYNC is received at the first point in time t1, which is a point in time when the sleep in mode Sleep in is switched to the sleep out mode Sleep out, and may count the fail time IT in which the synchronization signal ESYNC is not received. For example, the first counter 111 may not check whether the synchronization signal ESYNC is provided before the first point in time t1 is received. The first counter 111 may output the fail time IT to the first comparator 112.

When the activated synchronization signal ESYNC is normally output after the first point in time t1, the first counter 111 may determine that the initial synchronization fail error does not occur and may not count the fail time IT.

After the first point in time t1, the first comparator 112 may compare the fail time IT with the given initial time. When the fail time IT is greater than the initial time, the first comparator 112 may output the first signal SG1.

An initial time code may include a value designated for each initial time. The initial time code may correspond to a value composed of four bits. The initial time code may store a value of 4'b0000 designated with respect to 1 ms, a value of 4'b0001 designated with respect to 2 ms, and a value of 4'b1111 designated with respect to 16 ms. However, this is only an example, and the initial time code according to an embodiment of the present disclosure is not limited thereto.

When the initial time code is 4'b1111, the first comparator 112 may set the initial time to 16 ms and may determine whether the fail time IT exceeds 16 ms. When the fail time IT exceeds 16 ms, the first comparator 112 may output the first signal SG1. When the fail time IT does not exceed 16 ms and the driving controller TED normally receives the activated synchronization signal ESYNC within the initial time, the first comparator 112 may not output the first signal SG1.

As another example, when the initial time code is 4'b0001, the first comparator 112 may set the initial time to 2 ms and may determine whether the fail time IT exceeds 2 ms. When the fail time IT exceeds 2 ms, the first comparator 112 may output the first signal SG1. When the fail time IT does not exceed 2 ms and the driving controller TED normally receives the activated synchronization signal ESYNC within the initial time, the first comparator 112 may not output the first signal SG1.

The signal output circuit 120 may receive the first signal SG1. When the signal output circuit 120 receives the first signal SG1, the signal output circuit 120 may generate the error flag signal ERF and may output the error flag signal ERF to the host processor AP.

When the host processor AP receives the error flag signal ERF, the host processor AP may initialize the driving controller TED through the reset signal RST outputted to the driving controller TED. The host processor AP may deactivate the reset signal RST at an initialization point in time tr and may then activate the reset signal RST.

At the initialization point in time tr when the reset signal RST is deactivated (e.g., the reset signal RST has a low level), the driving controller TED may again operate in the on mode PWR UP. As the driving controller TED enters the on mode PWR UP, the driving controller TED may be initialized. In this case, the output of the first signal SG1 and the error flag signal ERF may be stopped. For example, after the initialization point in time tr, the first signal SG1 and the error flag signal ERF may not be output.

The reset signal RST may be again activated. As the reset signal RST is activated, the driving controller TED may operate in the sleep in mode Sleep in.

In the sleep in mode Sleep in, the host processor AP may again output the activated synchronization signal ESYNC to the driving controller TED.

At the first point in time t1, the host processor AP may output the sleep out command to the driving controller TED.

In response to the sleep out command, the driving controller TED may operate in the sleep out mode Sleep out.

From the first point in time t1, the first counter 111 may check whether the synchronization signal ESYNC is received. When the synchronization signal ESYNC is normally output, the first counter 111 may not count the fail time IT.

According to an embodiment of the present disclosure, in the event that an error occurs in the synchronization signal ESYNC, the driving controller TED may detect the error and may perform a recovery operation to ensure the reception of a normal synchronization signal ESYNC. Even though the error occurs in the synchronization signal ESYNC, the driving controller TED may receive the normal synchronization signal ESYNC through the recovery operation. The driving controller TED may synchronize the second clock signal CLK2 with the first clock signal CLK1 based on the synchronization signal ESYNC. Accordingly, a flicker due to a fine skew difference of the horizontal synchronization signal may be prevented. Additionally, the divergence of the horizontal synchronization signal due to the clock variation difference between the host processor AP and the driving controller TED may be prevented. Accordingly, the electronic device 1000 with improved display quality and improved reliability may be provided.

Figure 9:
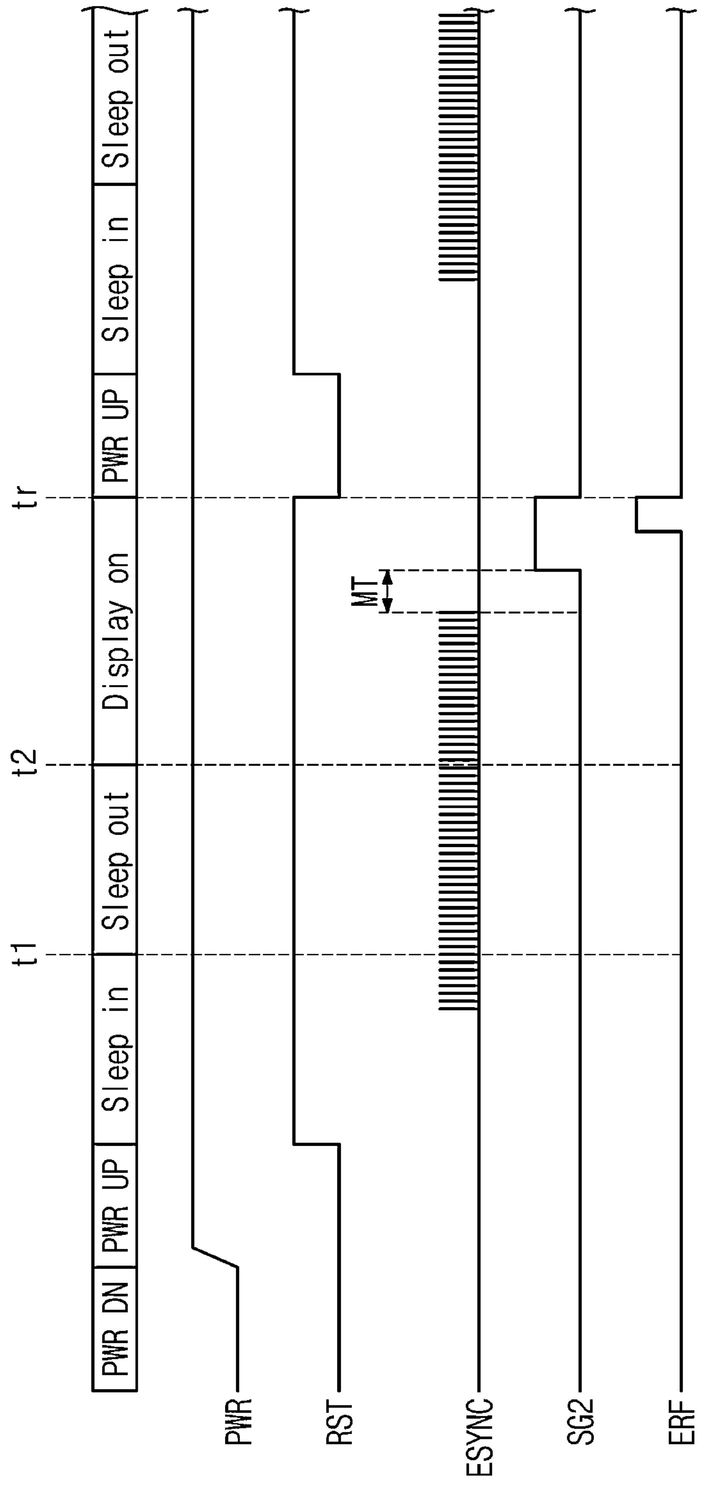
FIG. 9 is a timing diagram illustrating an operation of an electronic device according to an embodiment of the present disclosure.
Figures 10, 11:
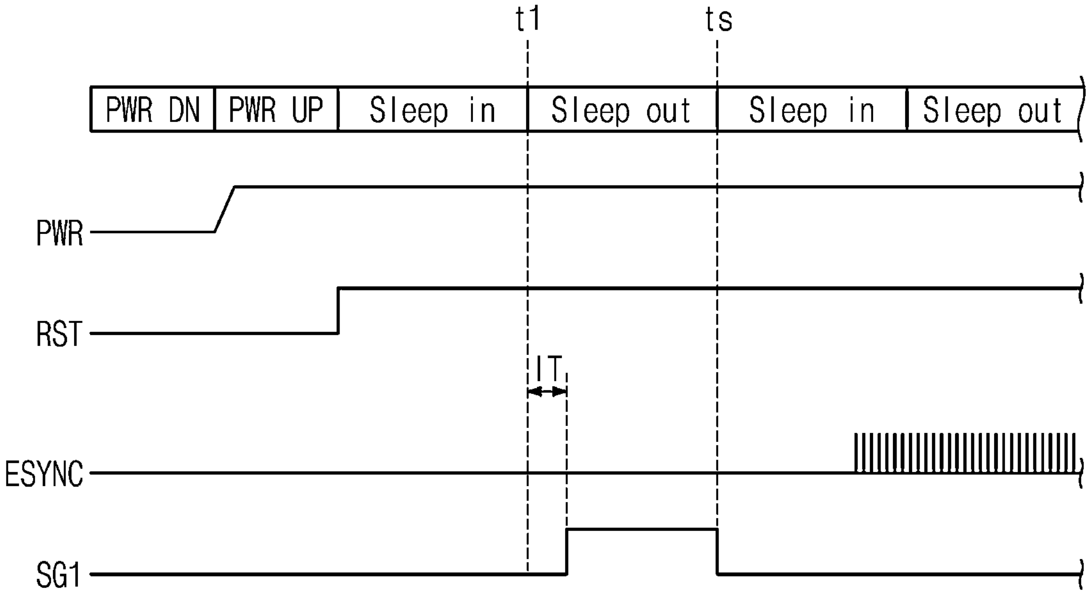
FIG. 10 is a diagram illustrating a loss toggle count code according to an embodiment of the present disclosure.
FIG. 11 is a timing diagram illustrating an operation of an electronic device according to an embodiment of the present disclosure.

FIG. 9 is a timing diagram illustrating an operation of an electronic device according to an embodiment of the present disclosure, and FIG. 10 is a diagram illustrating a loss toggle count code according to an embodiment of the present disclosure. In the description of FIG. 9, the components that are described with reference to FIG. 4 are marked by the same reference numerals/signs, and thus, an additional description will be omitted to avoid redundancy.

FIG. 9 shows an operation of an electronic device when the synchronization loss error occurs.

Referring to FIGS. 2, 6, 9, and 10, the driving controller TED may sequentially operate in the off mode PWR DN, the on mode PWR UP, the sleep in mode Sleep in, the sleep out mode Sleep out, and the display on mode Display on.

A portion of the synchronization signal ESYNC provided from the host processor AP may be omitted during the operation of the electronic device 1000. This may be a case in which the synchronization loss error occurs.

The error detector 110 may detect the error of the synchronization signal ESYNC. The error detector 110 may operate after the sleep out mode Sleep out in which the driving controller TED operates.

The second counter 113 may be activated after a give point in time and may count the number of continuous loss toggles MT of the synchronization signal ESYNC. The given point in time may be the second point in time t2. However, this is an example, and the given point in time according to an embodiment of the present disclosure is not limited thereto. For example, the given point in time may be the first point in time t1. Below, the description will be given as the given point in time is the second point in time t2.

The second counter 113 may output the number of loss toggles MT to the second comparator 114. For example, after the second point in time t2 when the driving controller TED operates in the display on mode Display On, the second counter 113 may detect the error of the synchronization signal ESYNC.

The second comparator 114 may compare the number of loss toggles MT with a predetermined value, and when the number of loss toggles MT is greater than the predetermined value, the second comparator 114 may output the second signal SG2.

The loss toggle count code may include a value designated for each predetermined value. The loss toggle count code may correspond to a value composed of three bits. The loss toggle count code may store a value of 3'b000 designated with respect to 0 ea, a value of 3'b001 designated with respect to lea, and a value of 3'b111 designated with respect to 8 ea. However, this is only an example, and the loss toggle count code according to an embodiment of the present disclosure is not limited thereto. For example, the predetermined value may indicate the minimum number of loss toggles capable of synchronizing the second clock signal CLK2 with the first clock signal CLK1 based on the synchronization signal ESYNC even though the loss toggle occurs.

When the loss toggle count code is 3'b111, the second comparator 114 may set the predetermined value to 8 ea and may determine whether the number of loss toggles MT exceeds 8 ea. When the number of loss toggles MT exceeds 8 ea, the second comparator 114 may output the second signal SG2. When the number of loss toggles MT does not exceed 8 ea and the normal synchronization signal ESYNC is received, the second comparator 114 may not output the second signal SG2.

As another example, when the loss toggle count code is 3'b001, the second comparator 114 may set the predetermined value to lea and may determine whether the number of loss toggles MT exceeds lea. When the number of loss toggles MT exceeds lea, the second comparator 114 may output the second signal SG2. When the number of loss toggles MT does not exceed lea and the normal synchronization signal ESYNC is received, the second comparator 114 may not output the second signal SG2.

The signal output circuit 120 may receive the second signal SG2. When the signal output circuit 120 receives the second signal SG2, the signal output circuit 120 may generate the error flag signal ERF and may output the error flag signal ERF to the host processor AP.

When the host processor AP receives the error flag signal ERF, the host processor AP may initialize the driving controller TED through the reset signal RST outputted to the driving controller TED. The host processor AP may deactivate the reset signal RST at the initialization point in time tr and may then activate the reset signal RST.

At the initialization point in time tr when the reset signal RST is deactivated, the driving controller TED may again operate in the on mode PWR UP. As the driving controller TED enters the on mode PWR UP, the driving controller TED may be initialized. In this case, the output of the second signal SG2 and the error flag signal ERF may be stopped. For example, after the initialization point in time tr, the second signal SG2 and the error flag signal ERF may not be output.

The reset signal RST may be again activated. As the reset signal RST is activated, the driving controller TED may operate in the sleep in mode Sleep in.

In the sleep in mode Sleep in, the host processor AP may again output the activated synchronization signal ESYNC to the driving controller TED.

At the first point in time t1, the host processor AP may output the sleep out command to the driving controller TED.

The driving controller TED receiving the sleep out command may operate in the sleep out mode Sleep out.

At a second point in time t2, the host processor AP may output the display on command that instructs the driving controller TED to output frame data stored in a buffer.

The driving controller TED receiving the display on command may operate in the display on mode Display on.

From the second point in time t2, the second counter 113 may check whether the synchronization signal ESYNC is received. When the synchronization signal ESYNC is normally output, the second counter 113 may not count the number of loss toggles MT.

According to the present disclosure, in the event that an error occurs in the synchronization signal ESYNC, the driving controller TED may detect the error and may perform a recovery operation to ensure the reception of a normal synchronization signal ESYNC. Even though the error occurs in the synchronization signal ESYNC, the driving controller TED may receive the normal synchronization signal ESYNC through the recovery operation. The driving controller TED may synchronize the second clock signal CLK2 with the first clock signal CLK1 based on the synchronization signal ESYNC. Accordingly, a flicker due to a fine skew difference of the horizontal synchronization signal may be prevented. Additionally, the divergence of the horizontal synchronization signal due to the clock variation difference between the host processor AP and the driving controller TED may be prevented. Accordingly, the electronic device 1000 with improved display quality and improved reliability may be provided.

FIG. 11 is a timing diagram illustrating an operation of an electronic device according to an embodiment of the present disclosure. In the description of FIG. 11, the components that are described with reference to FIG. 4 are marked by the same reference numerals/signs, and thus, an additional description will be omitted to avoid redundancy.

FIG. 11 shows an operation of an electronic device when the initial synchronization fail error occurs.

Referring to FIGS. 2, 6, 7, and 11, the driving controller TED may sequentially operate in the off mode PWR DN, the on mode PWR UP, the sleep in mode Sleep in, and the sleep out mode Sleep out.

The activated synchronization signal ESYNC may not be provided from the host processor AP to the driving controller TED during the operation of the electronic device 1000. The case where the driving controller TED fails to receive the activated synchronization signal ESYNC may be referred to as the case where the initial synchronization fail error occurs.

The error detector 110 may detect the error of the synchronization signal ESYNC. The error detector 110 may operate after the sleep out mode Sleep out in which the driving controller TED operates.

The first counter 111 may check whether the synchronization signal ESYNC is received at the first point in time t1, which is a point in time when the sleep in mode Sleep is switched to the sleep out mode Sleep out, and may count the fail time IT in which the synchronization signal ESYNC is not received. For example, the first counter 111 may not check whether the synchronization signal ESYNC provided before the first point in time t1 is received. The first counter 111 may output the fail time IT to the first comparator 112.

When the activated synchronization signal ESYNC is normally output after the first point in time t1, the first counter 111 may determine that the initial synchronization fail error does not occur and may not count the fail time IT.

After the first point in time t1, the first comparator 112 may compare the fail time IT with the given initial time. When the fail time IT is greater than the initial time, the first comparator 112 may output the first signal SG1.

When the first signal SG1 is output from the error detector 110, the driving controller TED may operate in the sleep in mode Sleep in. A point in time when the driving controller TED operates in the sleep in mode Sleep in may be referred to as a sleep point in time ts. The sleep point in time ts may be provided after the first signal SG1 is output. When the first signal SG1 is output, the driving controller TED may be automatically initialized. The driving controller TED may provide the host processor AP with a signal indicating that the driving controller TED is initialized. For example, the signal indicating that the driving controller TED is initialized may include a flag signal or the like.

As the driving controller TED operates in the sleep in mode Sleep in, the output of the first signal SG1 may be stopped.

After the driving controller TED is initialized, the synchronization signal ESYNC may be provided. The host processor AP may output the sleep out command to the driving controller TED. For example, the host processor AP may determine that the driving controller TED enters the sleep in mode Sleep in, based on the signal indicating that the driving controller TED is initialized and may output the sleep out command. The driving controller TED may operate in the sleep out mode Sleep out in response to the sleep out command.

Afterwards, the first counter 111 may check whether the synchronization signal ESYNC is received. When the synchronization signal ESYNC is normally output, the first counter 111 may not count the fail time IT.

According to an embodiment of the present disclosure, in the event that an error occurs in the synchronization signal ESYNC, the driving controller TED may detect the error and may perform a recovery operation to ensure the reception of a normal synchronization signal ESYNC. Even though the error occurs in the synchronization signal ESYNC, the driving controller TED may receive the normal synchronization signal ESYNC through the recovery operation. The driving controller TED may synchronize the second clock signal CLK2 with the first clock signal CLK1 based on the synchronization signal ESYNC. Accordingly, a flicker due to a fine skew difference of the horizontal synchronization signal may be prevented. Additionally, the divergence of the horizontal synchronization signal due to the clock variation difference between the host processor AP and the driving controller TED may be prevented. Accordingly, the electronic device 1000 with improved display quality and improved reliability may be provided.

According to the above description, in the event that an error occurs in a synchronization signal, a driving controller may detect the event and may perform a recovery operation to ensure the reception of a normal synchronization signal. Even though the error occurs in the synchronization signal, the driving controller may receive the normal synchronization signal through the recovery operation. The driving controller may synchronize a clock signal with a clock signal of a host processor based on the synchronization signal. Accordingly, a flicker due to a fine skew difference of a horizontal synchronization signal may be prevented. Additionally, the divergence of the horizontal synchronization signal due to the clock variation difference between the host processor and the driving controller may be prevented. Accordingly, an electronic device with improved display quality and improved reliability may be provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:

a host processor configured to generate a first clock signal and to output frame data and a synchronization signal, wherein the synchronization signal toggles based on the first clock signal;

a driving controller connected to the host processor, and configured to receive the synchronization signal and the frame data from the host processor and to generate a control signal based on a second clock signal; and a display panel configured to be driven based on the control signal, wherein the driving controller includes an error detector, wherein drive controller sequentially operates in an off mode, an on mode, a sleep-in mode, and a sleep-out mode, and wherein the error detection unit detects an error in the synchronization signal after the sleep out mode.

2. The electronic device of claim 1, wherein the driving controller synchronizes the second clock signal with the first clock signal based on the synchronization signal, and wherein the error is one of an initial synchronization fail error indicating that the driving controller did not receive the synchronization signal and a synchronization loss error indicating that a portion of the synchronization signal was omitted.

3. The electronic device of claim 2, wherein the error detector outputs a first signal when the error is the initial synchronization fail error and outputs a second signal different from the first signal when the error is the synchronization loss error.

4. The electronic device of claim 3, wherein the error detector includes:

a second counter configured to count the number of continuous loss toggles of the synchronization signal, wherein a loss toggle corresponds to when the synchronization signal does not toggle; and a second comparator configured to compare the number of loss toggles with a predetermined value and to output the second signal when the number of loss toggles is greater than the predetermined value.

5. The electronic device of claim 4, wherein, when the number of loss toggles is smaller than the predetermined value, the second comparator does not output the second signal.

6. The electronic device of claim 3, wherein the driving controller further includes:

a signal output circuit configured to generate an error flag signal when the first signal or the second signal is generated and to output the error flag signal to the host processor.

7. The electronic device of claim 6, wherein, when the host processor receives the error flag signal, the host processor initializes the driving controller through a reset signal output to the driving controller.

8. The electronic device of claim 7, wherein the drive controller operates in the on mode when the reset signal is deactivated.

9. The electronic device of claim 7, wherein the drive controller operates in the sleep-in mode when the reset signal is activated.

10. The electronic device of claim 7, wherein the host processor outputs the synchronization signal to the drive controller in the sleep-in mode.

11. The electronic device of claim 7, wherein, when the driving controller is initialized, the error flag signal is not output.

12. The electronic device of claim 3, wherein, when the first signal is output from the error detector, the driving controller is initialized and operates in a sleep in mode.

13. The electronic device of claim 12, wherein, when the driving controller operates in the sleep in mode, the error detector does not output the first signal.

14. The electronic device of claim 1, wherein the driving controller and the host processor communicate with each other through a Mobile Industry Processor Interface (MIPI).

15. The electronic device of claim 14, wherein the driving controller outputs a tearing signal to control a transfer period of the frame data to the host processor.

16. The electronic device of claim 15, wherein the driving controller controls a period of the tearing signal.

17. The electronic device of claim 14, wherein the frame data includes a vertical active area and a vertical blank area, and wherein the host processor controls a size of the vertical blank area.

18. The electronic device of claim 1, wherein the synchronization signal is output in the sleep-in mode.

* * * * *